United States Patent
Liang et al.

(10) Patent No.: US 12,058,223 B2
(45) Date of Patent: Aug. 6, 2024

(54) SYSTEM AND METHOD FOR PUSHING INFORMATION, AND DEVICE AND STORAGE MEDIUM THEREOF

(71) Applicant: BIGO TECHNOLOGY PTE. LTD., Singapore (SG)

(72) Inventors: Jiabiao Liang, Guangzhou (CN); Shuchao Chen, Guangzhou (CN); Hang Chen, Guangzhou (CN); Zhibiao Zhang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 20 days.

(21) Appl. No.: 17/780,223

(22) PCT Filed: Aug. 10, 2020

(86) PCT No.: PCT/CN2020/108217
§ 371 (c)(1),
(2) Date: May 26, 2022

(87) PCT Pub. No.: WO2021/103652
PCT Pub. Date: Jun. 3, 2021

(65) Prior Publication Data
US 2022/0417342 A1     Dec. 29, 2022

(30) Foreign Application Priority Data

Nov. 29, 2019  (CN) .......................... 201911205610.4

(51) Int. Cl.
*H04L 67/55* (2022.01)
*G06F 16/9535* (2019.01)

(52) U.S. Cl.
CPC .......... *H04L 67/55* (2022.05); *G06F 16/9535* (2019.01)

(58) Field of Classification Search
None
See application file for complete search history.

(56) References Cited

U.S. PATENT DOCUMENTS 8,307,110 B1    11/2012  Katzer et al.
2002/0199009 A1*  12/2002  Willner ................. H04L 67/564
                                         709/233
(Continued)

FOREIGN PATENT DOCUMENTS

CN     102231849 A    11/2011
CN     104065565 A     9/2014
(Continued)

OTHER PUBLICATIONS

Extended European Search Report Communication Pursuant to Rule 62 EPC, dated Jan. 5, 2023 in Patent Application No. EP 20891804.5, which is a foreign counterpart application to which this application claims priority.
(Continued)

*Primary Examiner* — Joshua Joo
(74) *Attorney, Agent, or Firm* — Kolitch Romano Dascenzo Gates LLC (57) ABSTRACT

Provided is a system for pushing information. The system for pushing information includes: a time-driven scheduling terminal, a push content generating terminal, and a push content candidate terminal; wherein the time-driven scheduling terminal is configured to calculate push time points of push users for different push service types according to push time point rules for the different push service types, and initiate content generation requests based on push service types and user bases at same push time points; and the push content generating terminal is configured to select, based on the content generation requests, target push content of the push users at the push time points corresponding to the push service types from the push content candidate terminal using
(Continued)

a dynamically configured content push algorithm, and feed the target push content back to the time-driven scheduling terminal.

17 Claims, 7 Drawing Sheets

(56) References Cited

U.S. PATENT DOCUMENTS

| | | | |
|---|---|---|---|
| 2014/0079044 A1* | 3/2014 | Ding | H04W 4/021 |
| | | | 370/338 |
| 2015/0248704 A1 | 9/2015 | Fujiwara et al. | |
| 2016/0307131 A1 | 10/2016 | Wang et al. | |
| 2017/0329856 A1 | 11/2017 | Jiang et al. | |
| 2019/0068736 A1* | 2/2019 | Naara | G06N 7/01 |
| 2021/0051122 A1* | 2/2021 | Bennah | G06F 16/433 |
| 2021/0125238 A1* | 4/2021 | Agarwal | G06Q 30/0261 |
| 2023/0186345 A1* | 6/2023 | Zdarko | G06Q 30/0249 |
| | | | 705/14.48 |
| 2023/0188621 A1* | 6/2023 | Gelfenbeyn | H04L 67/55 |
| | | | 709/206 |

FOREIGN PATENT DOCUMENTS

| | | |
|---|---|---|
| CN | 107302573 A | 10/2017 |
| CN | 108629045 A | 10/2018 |
| CN | 110049079 A | 7/2019 |
| CN | 110311963 A | 10/2019 |
| CN | 110489644 A | 11/2019 |
| CN | 110493306 A | 11/2019 |
| CN | 110990699 A | 4/2020 |
| WO | 2016048719 A1 | 3/2016 |

OTHER PUBLICATIONS

International Search Report of the International Searching Authority for State Intellectual Property Office of the People's Republic of China in PCT application No. PCT/CN2020/108217 issued on Nov. 12, 2020, which is an International application corresponding to this U.S. application.
The State Intellectual Property Office of People's Republic of China, First Office Action in Patent Application No. CN201911205610.4 issued on May 20, 2021, which is a foreign counterpart application corresponding to this U.S. Patent Application, to which this application claims priority.
The State Intellectual Property Office of People's Republic of China, Second Office Action in Patent Application No. CN201911205610.4 issued on Aug. 24, 2021, which is a foreign counterpart application corresponding to this U.S. Patent Application, to which this application claims priority.
Notification to Grant Patent Right for Invention No. 201911205610.4 issued on Nov. 2, 2021.
Summons to attend oral proceedings pursuant to Rule 115(1) EPC of counterpart European application No. 20891804.5 issued on Feb. 26, 2024.

* cited by examiner

SYSTEM AND METHOD FOR PUSHING INFORMATION, AND DEVICE AND STORAGE MEDIUM THEREOF

CROSS-REFERENCE TO RELATED APPLICATION

The present disclosure is a U.S. national stage of international application No. PCT/CN2020/108217, filed on Aug. 10, 2020, which claims priority to the Chinese patent application No. 201911205610.4, filed on Nov. 29, 2019, the contents of which are herein incorporated by references in their entireties.

TECHNICAL FIELD

The present disclosure relates to the technical field of data transmission, and in particular, relates to a system, method and apparatus for pushing information, and a device and a storage medium thereof.

BACKGROUND

For improvement of activity of users in a plurality of push applications and for a good use experience of the users in browsing various types of information in the push applications, stricter requirements are being imposed on content push services. The content push service is mainly directed to: 1) screening push content of interest for the users; and 2) scheduling appropriate content push time points for different users.

SUMMARY

Embodiments of the present disclosure provide a system, method and apparatus for pushing information, and a device and a storage medium thereof.

The embodiments of the present disclosure provide a system for pushing information. The system for pushing information includes: a time-driven scheduling terminal, a push content generating terminal, and a push content candidate terminal; wherein the time-driven scheduling terminal is configured to calculate push time points of push users for different push service types according to push time point rules for the different push service types, and initiate content generation requests based on push service types and user bases at same push time points; and the push content generating terminal is configured to select, based on the content generation requests, target push content of the push users at the push time points corresponding to the push service types from the push content candidate terminal using a dynamically configured content push algorithm, and feed the target push content back to the time-driven scheduling terminal.

The embodiments of the present disclosure provide a method for pushing information. The method for pushing information includes:

calculating content request opportunities that match push service types corresponding to push time points of push users and user bases at the push time points, wherein the push time points are calculated according to push time point rules for different push service types; and determining, at the content request opportunities, target push content of the push users at the push time points corresponding to the push service types using a dynamically configured content push algorithm, wherein the target push content is content for the push service types corresponding to the push time points.

The embodiments of the present disclosure provide an apparatus for pushing information. The apparatus for pushing information includes:

an opportunity calculating module, configured to calculate content request opportunities that match push service types corresponding to push time points of push users and user bases at the push time points, wherein the push time points are calculated according to push time point rules for different push service types; and a target content determining module, configured to determine, at the content request opportunities, target push content of the push users at the push time points corresponding to the push service types using a dynamically configured content push algorithm, wherein the target push content is content for the push service types corresponding to the push time points.

The embodiments of the present disclosure provide a device. The device includes:

one or more processors; and a memory, configured to store one or more programs;

wherein the one or more processors, when running the one or more programs, are caused to perform the method for pushing information according to any of the embodiments of the present disclosure.

The embodiments of the present disclosure provide a computer-readable storage medium. The computer-readable storage medium stores a computer program, wherein the computer program, when run by a processor, causes the processor to perform the method for pushing information according to in any of the embodiments of the present disclosure.

DETAILED DESCRIPTION

The following describes the present disclosure hereinafter in connection with the accompanying drawings and the embodiments. The embodiments described herein are only intended to explain, but limit, the present disclosure. In addition, only some, but not all, of the structures associated with the present disclosure are shown in the accompanying drawings.

Generally, a single content push algorithm and push time determination algorithm are uniformly configured into a system for pushing content. For example, in the case that the content of interest is pushed to the user in an event-driven manner, once new content uploaded by the user is received, users with a higher similarity degree are immediately filtered based on feature information of history browse content of other users and the feature information of the new content, and then the new content is directly pushed to the users. In this case, content production, content selection, and content push form a closed loop in the content push service, and whether it is convenient for the push user to receive the push content cannot be determined. As such, excessively frequent content push may cause interference to the push user. Alternatively, lists of push time points are manually arranged for different types of users, and the content of interest is filtered and pushed using a uniformly configured content push algorithm. Consequently, different push time points for different users of the same type cannot be satisfied.

In the related art, the content of interest is pushed at an appropriate push time point by uniformly configuring the single content push algorithm and push time determination algorithm. In this case, the single content push algorithm and push time determination algorithm are not adaptable to a scenario of multiple push services, have some push problems, and push effect are not controllable.

First Embodiment

Figure 1:
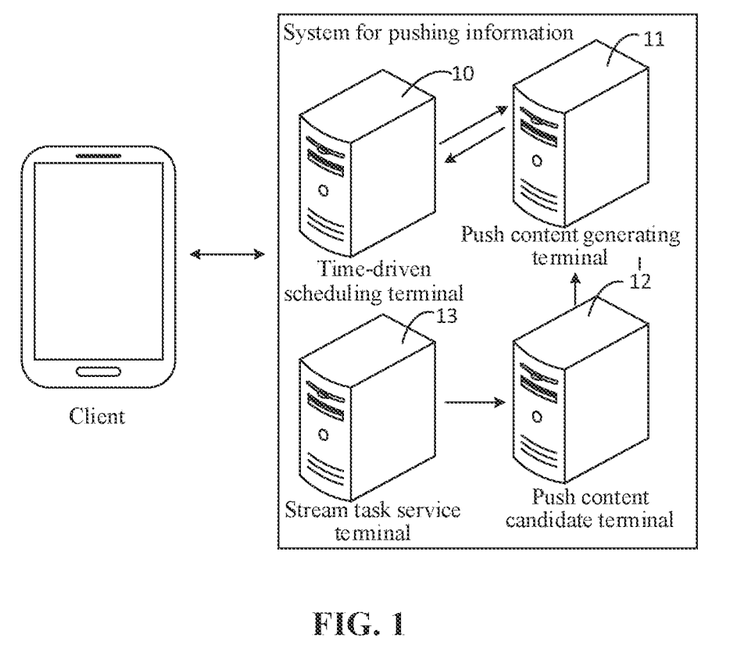
FIG. 1 is a block diagram of a system for pushing information according to a first embodiment of the present disclosure.

FIG. 1 is a block diagram of a system for pushing information according to this embodiment. This embodiment is applicable to any scenario of pushing information. Referring to FIG. 1, the system for pushing information may include: a time-driven scheduling terminal 10, a push content generating terminal 11, and a push content candidate terminal 12.

The time-driven scheduling 10 terminal is configured to calculate push time points of push users for different push service types according to push time point rules for the different push service types, and initiate content generation requests based on push service types and user bases at same push time points; and the push content generating terminal 11 is configured to select, based on the content generation requests, target push content of the push users at the push time points corresponding to the push service types from the push content candidate terminal 12 using a dynamically configured content push algorithm, and feed the target push content back to the time-driven scheduling terminal 10.

Optionally, this embodiment is applicable in a push scenario of multiple types of messages of planning suitable push time points for a plurality of push users and screening push content of most interest from content of the multiple types of messages to push to the push users at the push time points. In this case, planning the push time points, screening the push content, and storing the message content are separately performed in this embodiment to improve processing performance of the information push. Thus, the time-driven scheduling terminal 10 corresponding to planning of the push time point, the push content generating terminal 11 corresponding to screening of the push content, and the push content candidate terminal 12 corresponding to storing of the message content are configured to perform different functions. In order to ensure the processing performance of the terminals, the time-driven scheduling terminal 10, the push content generating terminal 11, and the push content candidate terminal 12 are deployed in a distributed mode. Because the corresponding push function is configured for a plurality of servers in the system for pushing information, and the plurality of servers are organized into the time-driven scheduling terminal 10, the push content generating terminal 11, and the push content candidate terminal 12 that are predetermined. The number of servers in the terminals may be determined based on the processing performance, which is not limited in this embodiment. For example, in the case that the message content stored in the push content candidate terminal 12 is excessively large, the number of servers in the push content candidate terminal 12 may be additionally increased to relieve storage pressure of each server.

The functions of the time-driven scheduling terminal 10, the push content generating terminal 11, and the push content candidate terminal 12 are described hereinafter.

The time-driven scheduling terminal 10 is taken as a trigger for the system for pushing information, and different types of push service are configured for corresponding push time point rules in the time-driven scheduling terminal 10, which ensures the accuracy of push time points for different push service types. In this case, the push time point rules may include manual intervention arrangements, predetermined push time point algorithms, and the like. For example, for the push service with slow service data update or the push service with a fixed push time point, the manual intervention arrangement may be applied to organize the push users in terms of different attributes such as region, country, or language, such that the push time points for the push service types are defined for the plurality of push users. For example, for the push service that service data with fast service data update or the push service with an unfixed browsing time point of the user, the push time point algorithm may be applied to analyze history behavior data of the plurality of push users, such that the push time points for the push service types are defined for the plurality of push users. Illustratively, a plurality of time segments are predefined, and the push time points suitable for the push user are analyzed based on history activity information of the push user within a history time period, such as history active time points (user online time points), and click preference time points for the push content, such that different push users are assigned to different time segments. Each push user may fall within the plurality of time segments, and thus push time points of the different push users are adaptively adjusted.

In this embodiment, the time-driven scheduling terminal 10 calculates the push time points for the plurality of push users for the different push service types according to the push time point rules for the different push service types, such that one push time point table is maintained on the time-driven scheduling terminal 10 for each push user. The push time point table records the push time points of the push users for the different push service types, the push service types for a plurality of push time points and the user bases at the same push time points are analyzed subsequently, and push content pushed to the users at each push time point is requested from the push content generating terminal 11 at a suitable opportunity, so as to avoid a time delay of the push due to failure of generation of suitable push content at the push time point caused by an excessive data processing amount. Illustratively, in the case that the push service type is updated fast and the user base at the same push time point is small, the content generation request may be directly initiated at a time point closest to the push time point to ensure the accuracy of the push content; and in the case that the push service type is updated slowly or the user base at the same push time point is large, the content generation request may be initiated at a period of time ahead (e.g., a previous day) of the push time point to ensure that the push content corresponding to the push time point may be generated within a sufficient time period. In order to ensure the accuracy of the opportunity for initiating the content generation requests, different weights may be predetermined for the push service types and the user bases at the same push time points in this embodiment to determine accurate request opportunities.

The push content generating terminal 11 is a content screening portion of the system for pushing information, and the push content generating terminal 11 is provided with a dynamic configuration interface for dynamically configuring the corresponding content push algorithm. Illustratively, in this embodiment, the dynamic configuration interface may push the content push algorithm with higher accuracy to replace the previous content push algorithm, so as to reconfigure the new content push algorithm onto the push content generating terminal 11 to achieve dynamic extensibility of the content push algorithm in the system for pushing information.

In the case that the push content generating terminal 11 receives the content generation requests initiated by the time-driven scheduling terminal 10, the content generation requests may include push user identifications and the push service types corresponding to the push time points, and thus it is convenient for the push content generating terminal 11 to determine the push users of the present push and the push service types corresponding to the corresponding the push time points. In this case, the push content generating terminal 11 may select the message content of most interest of each push user for the push service types corresponding to the push user from the multiple types of message content stored in the push content candidate terminal 12 using the dynamically configured content push algorithm, may take the message content of most interest as the target push content of each push user at the push time points corresponding to the push service types, and may feed the target push content, hack to the time-driven scheduling terminal 10. In this case, the time-driven scheduling terminal 10 may push the target push content corresponding to the push time points to the corresponding push users at the push time points corresponding to the push service types, which ensures the timeliness and accuracy of pushing information.

In order to ensure the efficiency of pushing information, the content generation request initiated by the time-driven scheduling terminal 10 in this embodiment may be used to request the push content of the same push user at different push time points, and may further be used to request the push content of different push users at the same push time point, which is not limited in this embodiment. In the case that the content generation request for the push content generating terminal 11 receives the push content of the same push user at different push time points, the push content generating terminal 11 may screen out the plurality of message content from the push content candidate terminal 12 using the dynamically configured content push algorithm, and distribute the plurality of message content to different push time points based on the rule, such as, distributing the plurality of message content in one-to-one correspondence based on a chronological order of the push time points and a match degree between the message content and the push users, or performing a match analysis on the screened message content at each push time point and sequentially redistributing the different push time points based on the match degree, which is not limited in this embodiment.

The push content candidate terminal 12 is a storage portion of the system for pushing information, and the push content candidate terminal 12 is configured to store the multiple types of message content uploaded by the different types users in the push application and corresponding user operation parameters after the multiple types of message content are pushed to the different push users. In this way, the push content generating terminal 11 may refer to the user operation parameters of the multiple types of message content in the case that the push content generating terminal 11 selects, based on the content generation request, the target push content of the push user at the corresponding push time point using the dynamically configured content push algorithm, thereby improving the accuracy of the push content, in the case that the amount of the message content store is excessively large, the servers of the push content candidate terminal 12 may be deployed in a distributed mode to implement partition-based content storage and the number of servers in the push content candidate terminal 12 may be additionally added in the process of information push, such that the efficiency of storing the message content is ensured.

In order to collect the content uploaded by the user and monitor operation condition of the plurality of push users for push information in real time, this embodiment may further include a stream task service terminal 13 configured to collect the content uploaded by the user and store the content uploaded by the user to the push content candidate terminal 12, and update, based on expose events and click events of the content uploaded by the user reported by the push user, exposure statistical parameters and click statistical parameters of the content uploaded by the user stored on the push content candidate terminal 12.

In the case that the push user uploads the new message content to the system for pushing information, the stream task service terminal 13 in the system for pushing information may collect the message content uploaded from the client in real time, and store the message content uploaded from the client to the push content candidate terminal 12. In the case that the time-driven scheduling terminal 10 pushes the message content to the push user, the client to which the push user logs in may report the expose events and the click events of the message content. The expose event is a determination message fed back when the client to which the push user logs in successfully receives the pushed message content, and the click event is a determination message for determination whether the push user browses the pushed message content. In the case that the stream task service terminal 13 collects the expose events and the click events of the message content reported from the client, the exposure statistical parameters and the click statistical parameters of the message content on the push content candidate terminal are updated based on the exposure and click conditions, so as to improve the accuracy of the subsequent push content.

In the technical solutions according to this embodiment, the system for pushing information includes the time-driven scheduling terminal, the push content generating terminal, and the push content candidate terminal. The time-driven scheduling terminal is provided with the corresponding push time point rules for different push service types, the push content generating terminal is provided with the dynamically configured content push algorithm. In this case, the time-driven scheduling terminal calculates the push time points of the plurality of push users for the different push service types according to the push time point rules for different push service types, and initiates the content generation requests based on the push service types and user bases at the same push time points, such that the accuracy of the opportunities for initiating the content generation requests is ensured. In the case that the user base at the same push time point is too large, the content generation request corresponding to the push service type may be initiated in advance to avoid the slow content generation caused by excessively large system throughput and congested content. The push content generating terminal is configured to select, based on the content generation requests, the target push content of the push users at the push time points corresponding to the push service types from the push content candidate terminal using the dynamically configured content push algorithm, and feed the target push content back to the time-driven scheduling terminal, such that the target push content can be successfully generated prior to the push time point, and timeliness of the information push and the system stability may be ensured. Meanwhile, the push content generating terminal achieves the extendibility of the content push algorithm by dynamically configuring the content push algorithm. In this embodiment, the content generation requests are initiated prior to the push time points corresponding to the push service types, and the target push content corresponding to the push service types is generated using the dynamically configured content push algorithm, such that a closed loop of content production, content selection, and content push formed in the information push service is achieved, and the accuracy of the push time points and the push content is improved.

Second Embodiment

Figure 2:
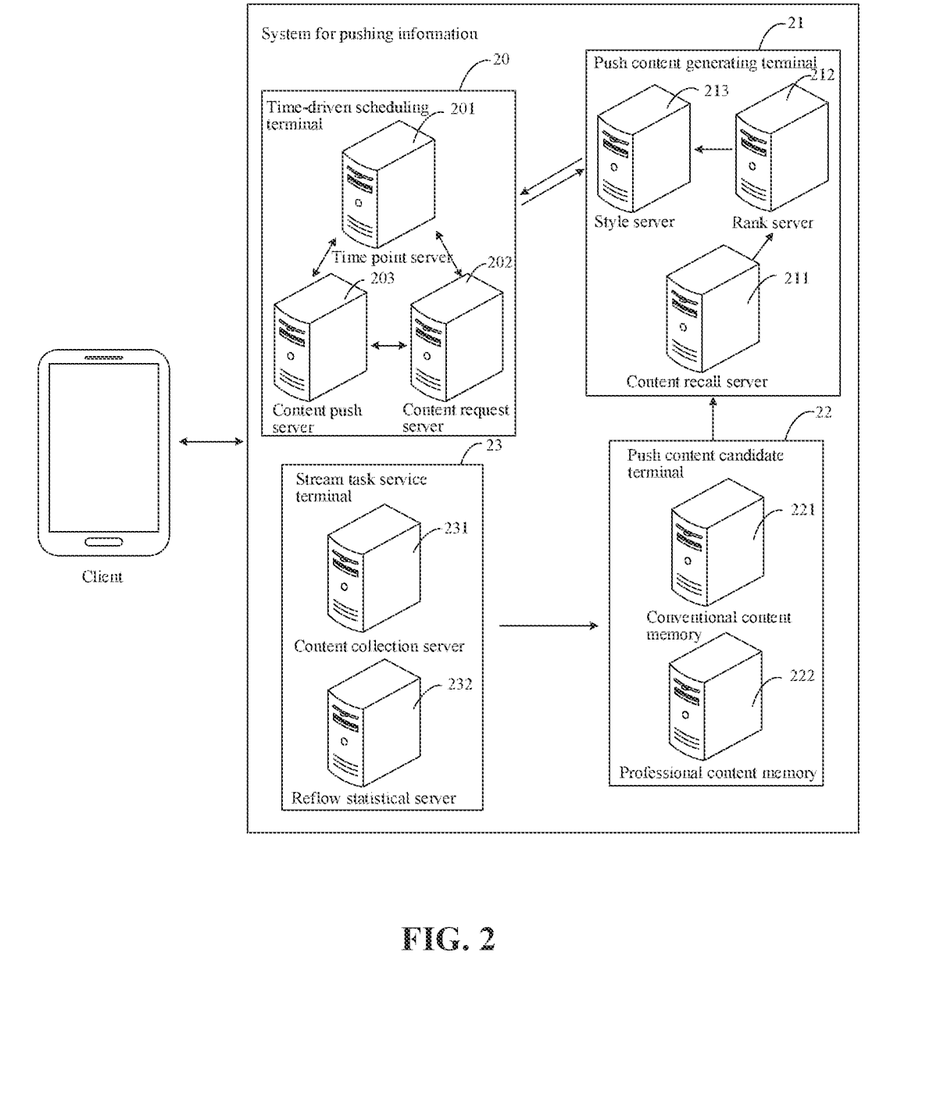
FIG. 2 is an architectural diagram of a system for pushing information according to a second embodiment of the present disclosure.

FIG. 2 is an architectural diagram of a system for pushing information according to this embodiment. This embodiment is described based on the above embodiment. Optionally, as shown in FIG. 2, this embodiment illustrates the configuration of the time-driven scheduling terminal 20, the push content generating terminal 21, the push content candidate terminal 22, and the stream task service terminal 23 in the system for pushing information. Optionally, the time-driven scheduling terminal 20 may include a time point server 201, a content request server 202, and a content push server 203 based on different functions in the push time point process.

The time point server 201 is provided with push time point rules for different push service types. As in the information push process, the need of the push user for the time point may change, and push users may be added, the time point server may calculate push time points of a plurality of push users for the different push service types according to the push time point rules for the different push service types at a predetermined time interval, such that the accuracy of the push time points of the plurality of push users for the different push service types is ensured. The content request server 202 accesses the push time points of the plurality of push users for the different push service types in the time point server 201 at different push service types in real time, determines content request opportunities corresponding to the different push time points based on the push service types and user bases at same push time points, and initiates the content generation requests to the push content generating terminal at the content request opportunities, wherein the content request opportunities are prior to push time points corresponding to the content request opportunities, such that the push content generating terminal 21 acquires the target push content corresponding to the push time points in time prior to the push time points corresponding to the content request opportunities, thereby ensuring the timeliness of the information push. The content push server 203 receives the target push content at the push time point fed back by the push content generating terminal 21, and pushes the target push content corresponding to the push time points fed back by the push content generating terminal to the push users at push time points.

Based on the different functions in the process of pushing information, the push content generating terminal 21 may include a content recall server 211 and a rank server 212 that are deployed in a distributed mode. In the case that the push content generating terminal 21 receives the content generation requests initiated by the time-driven scheduling terminal 20, because the time-driven scheduling terminal 20 may simultaneously request the push content of the different push users at the same push time point, the push content generating terminal 21 in this embodiment may distribute the content generation requests for the different push users to the different content recall servers 211 to simultaneously perform the push content determination operations of the different push users.

Upon receiving the content generation request, the content recall server 211 first determines the push users of the present request and the push service types corresponding to the corresponding push time points, and then recalls initial sets of push content under a predetermined condition from the push content candidate terminal 22 for the push users using a predetermined similarity algorithm. In this case, the predetermined condition may be the upper limit of the number of message content of interest of the push user recalled from the initial sets of push content and the push service types of the recalled message content being the push service types corresponding to the push time point to be pushed in the present request in the content generation request, such that the message content in the initial set of push content is the push service type corresponding to the push time point of the present request. Illustratively, the content recall server 211 may recall the number of the message content of interest of the push user corresponding to closest similarity degree based on information of different attributes of the push user (such as the country, the language, the age, the gender, the history behavior, and the like) form the push content candidate terminal 22. The rank server 212 ranks the plurality of message content in the initial sets of push content recalled by the content recall server 211 using a predetermined match algorithm, and selects the target push content of the push users at the corresponding push time points based on a ranking result. In the case that there is one push time point, best ranked message content is selected as the target push content at the push time point; in the case that a plurality of the push time points are present, top ranked message content at a quantity the same as the quantity of push time points is selected, and a match analysis is performed again based on the chronological order of the push time points, so as to determine the target push content at the plurality of push time points.

Furthermore, in order to improve the push experience of the push user, this embodiment may further include a display diversity of the target push content, and the push content generating terminal 21 may further include a style server 213. The style server 213 first looks up version information of the client to which the push user logs in, analyzes history behavior data of the push user for the pushed message content, and determines display style parameters of the target push content based on the version information of the client to which the push user logs in and/or the history behavior data of the push user. For example, for a push user that has not browsed the push content within a predetermined time period, the target push content may be set as a pop-up style push to prompt the push user to browse, and the target push content and the corresponding display style parameters may be fed back to the time-driven scheduling terminal 20, such that the time-driven scheduling terminal 20 pushes the target push content and the corresponding display style parameters to the push user at the corresponding push time point, and the client to which the push user logs in displays the target push content with the display style parameters. As such, the personalized display of the push content is improved, and the information push is fully achieved for different clients.

In order to distinguish the message content uploaded by different types of users, the push content candidate terminal 22 may include a conventional content memory 221 and a professional content memory 222. Users in the push application include ordinary users and authenticated professional users. In this case, the stream task service terminal 23 may store the original content uploaded by an ordinary user and collected in real-time to the conventional content memory 221, and store content uploaded by an authenticated professional user in the push application to the professional content memory 222. In this embodiment, the conventional content memory 221 and the professional content memory 222 are deployed in a distributed mode. In the case that the stored content is too large, the functions corresponding to the server may be additionally added to ensure extensibility of the content store.

The stream task service terminal 23 may include a content collection server 231 and a reflow statistical server 232. The content collection server 231 collects the message content uploaded by the plurality of push users in real-time, and store, based on types of the push users, the message content to the conventional content memory 221 and the professional content memory 222 in the push content candidate terminal 22. After pushing the different message content to the plurality of push users, the reflow statistical server 232 collects the expose events and the click events of the plurality of message contents uploaded from the clients to which the push users log in in real time, and sends exposure notifications corresponding to the expose events and click notifications corresponding to the click events to the push content candidate terminal, such that the push content candidate terminal 22 updates the exposure statistical parameters and the click statistical parameters of the message content in the conventional content memory 221 and the professional content memory 222, thereby improving the accuracy of the subsequent information push.

In the technical solutions according to this embodiment, the time-driven scheduling terminal, the push content generating terminal, the push content candidate terminal, and stream task service terminal are deployed in a distributed mode in the system for pushing information. The push time points for different push service types are disposed for the push users, the content generation requests are initiated prior to the push time points, and the target push content of most interest of the push users at the push time points are acquired in time to push to the push users at the push time points. In this case, the content generation request corresponding to the push service type may be initiated in advance to avoid the slow content generation caused by excessively large system throughput and congested content, such that the target push content can be successfully generated prior to the push time point, and timeliness of the information push and the system stability may be ensured. Meanwhile, the push content generating terminal achieves the extendibility of the content push algorithm by dynamically configuring the content push algorithm. In this embodiment, the content generation requests are initiated prior to the corresponding push time points, and the target push content is generated using the dynamically configured content push algorithm, such that a closed loop of content production, content selection, and content push formed in the information push service is achieved, and the accuracy of the push time points and the push content is improved.

Third Embodiment

Figure 3A:
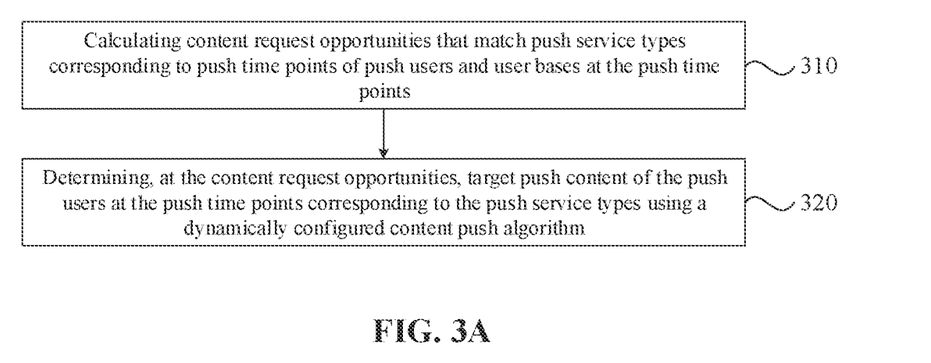
FIG. 3A is a flowchart of a method for pushing information according to a third embodiment of the present disclosure.

FIG. 3A is a flowchart of a method for pushing information according to this embodiment. This embodiment is applicable to any scenario of pushing information. The method for pushing information according to this embodiment may be performed by the apparatus for pushing information according to the embodiments of the present disclosure. The apparatus may be performed by software and/or hardware, and may be integrated in a device for performing the method, which may be a backend service terminal corresponding to any push application.

Referring to FIG. 3A, the method may include the following processes.

In S310, content request opportunities that match push service types corresponding to push time points of push users and user bases at the push time points are calculated The push time points are acquired according to the push time point rules for the different push service types. The push time rules for the different push service types are preconfigured in this embodiment for the different push service types, and the push time point rules may include manual intervention arrangement and predetermined push time point algorithms, and the like. In this case, the push time points of the plurality of push users for the different push service types may be calculated according to the push time point rules for the different push service types, and one push time point table is maintained for each push user to record the push time points of the push user for different push service types.

Optionally, in this embodiment, in order to avoid a time delay of the content push due to the failure of generation of suitable push content at the push time point caused by an excessive data processing amount, prior to the plurality of push time points of the user, the time-driven scheduling terminal is configured to analyze the push service types corresponding to the push time points and the user bases at the same push time points, determine whether the service data for the push service types are updated fast, or whether the user base is too large to cause a large calculation amount of the push data, and calculate content request opportunities that match the push service types corresponding to the push time points of the push users and the user bases at the push time points. Illustratively, in the case that the push service type is updated fast and the user base at the same push time point is less, the content request opportunity may be set at a time point closer to the push time point to ensure the accuracy of the push content; in the case that the push service type is updated slowly or the user base at the same push time point is large, the content request opportunity may be at a period of time ahead (e.g., a previous day) of the push time point to ensure that the push content corresponding to the push time point may be generated within a sufficient time period. In order to ensure the accuracy of the opportunity for initiating the content generation requests, different weights may be predetermined for the push service types and the user bases at the same push time points in this embodiment to determine an calculate accurate request opportunity based on the push service types of the push users corresponding to the push time point, the user bases at the push time point, and the weights corresponding to the push service types and the user bases, such that timeliness of acquiring the push content at the push point is ensured.

In S320, target push content of the push users at the push time points corresponding to the push service types is determined at the content request opportunities using a dynamically configured content push algorithm.

The target push content is the content for the push service type at the push time point. The content push algorithm may be dynamically pre-configured in this embodiment, and the content push algorithm may be the content push algorithm with a higher accuracy in the related art, and may be dynamically updated, which is not limited in this embodiment.

Optionally, after determining the corresponding content request opportunities by the time-driven scheduling terminal, the content generation requests may be initiated at the content request opportunities to the push content generating terminal. The content generation request may include push user identifications and the push service types corresponding to the different push time points. The message content of most interest of each push user for the push service types corresponding to the push user is selected, based on the content generation requests, from the multiple types of message content stored in the push content candidate terminal using the dynamically configured content push algorithm, and the message content of most interest is taken as the target push content of each push user at the corresponding push time point. In this case, the target push content is the message content for the push service type corresponding to the push time point.

Figure 3B:
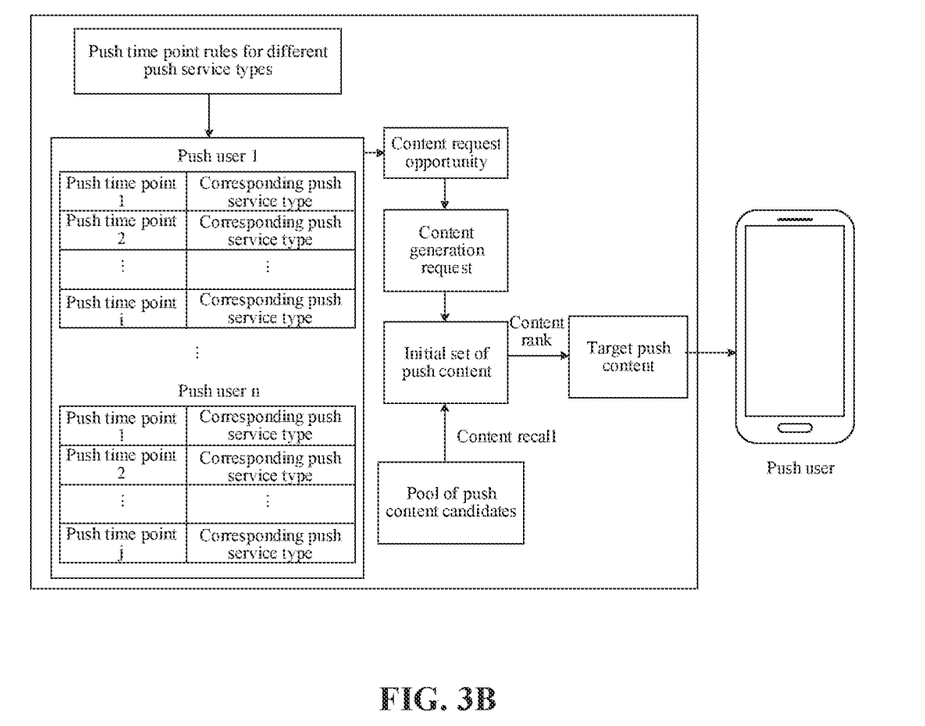
FIG. 3B is a schematic diagram of a process of pushing information according to the third embodiment of the present disclosure.

Optionally, as shown in FIG. 3B, in the case that the target push content of the push user at the corresponding push time point is determined using the dynamically configured content push algorithm, the content push algorithm may include a predetermined similarity algorithm and a predetermined match algorithm, and the target push content may be screened. In this case, determining, at the content request opportunities, the target push content of the push users at the push time points corresponding to the push service types using the dynamically configured content push algorithm may include: recalling, at the content request opportunities, initial sets of push content under a predetermined condition from a pool of push content candidates for the push users using the predetermined dynamically configured similarity algorithm; and ranking the plurality of message content in the initial sets of push content using the predetermined match algorithm, and selecting the target push content of the push users at the push time points corresponding to the push service types based on a ranking result.

Upon acquiring the content generation requests at the content request opportunities, the content recall server first determines the push users of the present request and the push service types corresponding to the corresponding push time points, and then recalls the initial sets of push content under the predetermined condition from the push content candidate terminal for the push users using the predetermined similarity algorithm by performing corresponding content recall function. In this case, the predetermined condition may be the upper limit of the number of message content of interest of the push user recalled from the initial sets of push content and the push service types of the recalled message content being the push service types corresponding to the push time point to be pushed in the present request in the content generation request, such that the message content in the initial set of push content is the push service type corresponding to the push time point of the present request. The rank server ranks the plurality of message content in the initial sets of push content using the predetermined match algorithm, and selects the target push content of the push users at the corresponding push time points based on the ranking result. For example, there is one push time point, best ranked message content is selected as the target push content at the push time point; in the case that a plurality of the push time points are present, top ranked message content at a quantity the same as the quantity of push time points is selected, and a match analysis is performed again based on the chronological order of the push time points to determine the target push content at the plurality of push time points. In addition, the target push content is pushed to the push user at the push time point, so as to ensure the accuracy of the push time points and the push content.

In the technical solutions according to this embodiment, the push service types corresponding to the push time points for the different push service types and the user bases at push time points are calculated according to push time point rules for the different push service types, the content request opportunities corresponding to the push time points are determined based on the push service types and the user bases, wherein the content request opportunities are prior to push time points. The target push content of the push users at the push time points corresponding to the push service types is determined at the content request opportunities using the dynamically configured content push algorithm, such that the target push content at the push time points may be timely acquired prior to the push time points, the slow content generation caused by excessively large system throughput and congested content are avoided, and the target push content may be successfully generated prior to the push time point to ensure timeliness of the information push and the system stability. Meanwhile, the push content generating terminal achieves the extendibility of the content push algorithm by dynamically configuring the content push algorithm. In this embodiment, the content generation requests are initiated prior to the corresponding push time point, and the target push content corresponding to the push service type is generated using the dynamically configured content push algorithm, such that a closed loop of content production, content selection, and content push formed in the information push service is achieved, and the accuracy of the push time points and the push content is improved.

Fourth Embodiment

Figure 4A:
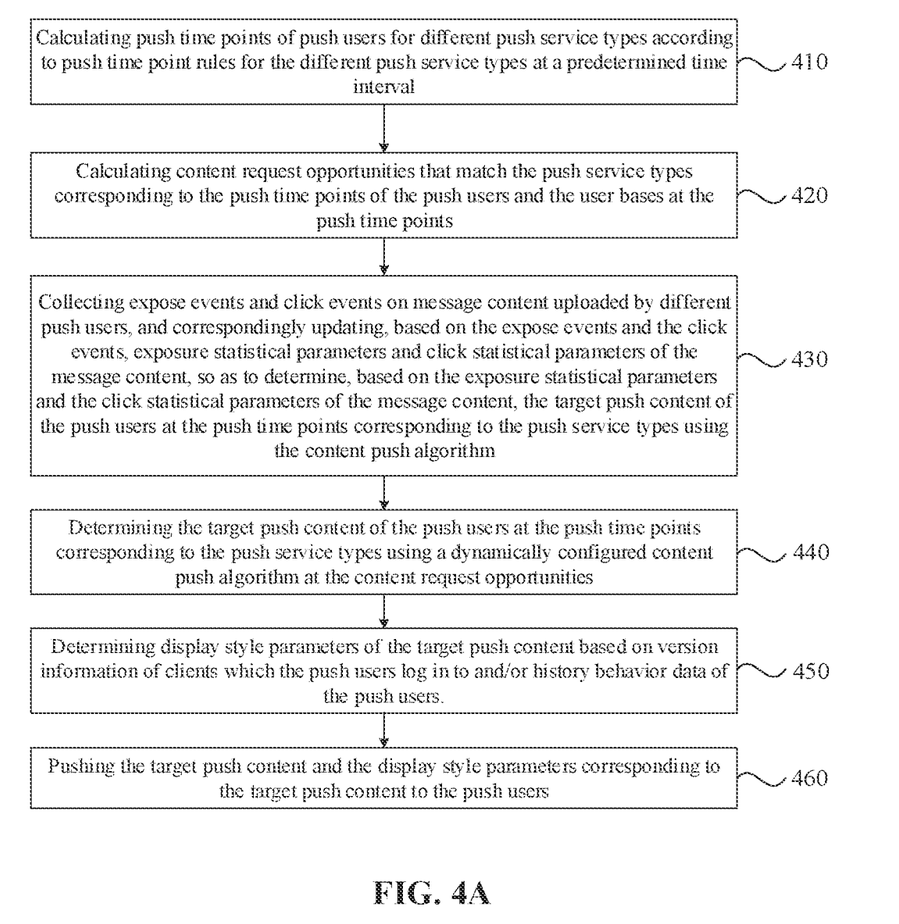
FIG. 4A is a flowchart of a method for pushing information according to a fourth embodiment of the present disclosure.
Figure 4B:
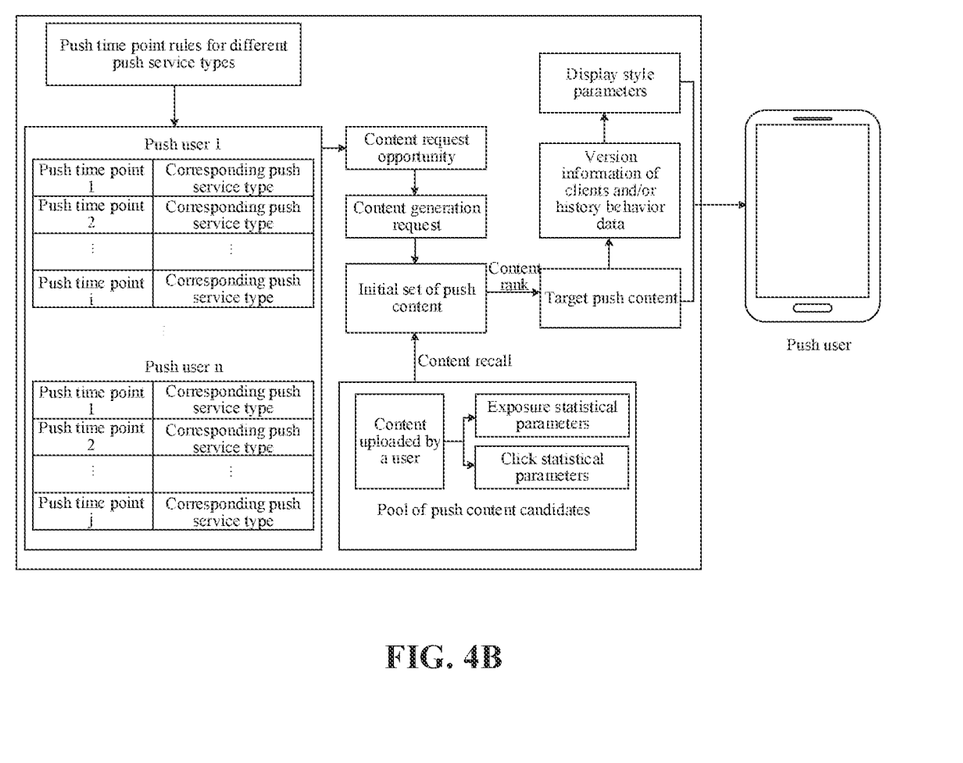
FIG. 4B is a schematic diagram of a process of pushing information according to the fourth embodiment of the present disclosure.

FIG. 4A is a flowchart of a method for pushing information according to this embodiment, and FIG. 4B is a schematic diagram of a process of pushing information according to this embodiment. This embodiment is described based on the above embodiment, and this embodiment mainly explains and describes other cases in the process of pushing information.

Optionally, as shown in FIG. 4A, this embodiment may include the following processes.

In S410, push time points of push users for different push service types are calculated according to push time point rules for the different push service types at the predetermined time interval.

Optionally, as in the information push process, the need of the push user for the time point may change, and push users may be added, the push time points of the push users for the different push service types are calculated according to the push time point rules for the different push service types at the predetermined time interval to timely update the push time points of the push users for different push service types.

In S420, content request opportunities that match the push service types corresponding to the push time points of the push users and the user bases at the push time points are calculated.

In S430, expose events and click events on message content uploaded by different push users are collected, and exposure statistical parameters and click statistical parameters of the message content are correspondingly updated based on the expose events and the click events, so as to determine, based on the exposure statistical parameters and the click statistical parameters of the message content, the target push content of the push users at the push time points corresponding to the push service types using the content push algorithm.

Optionally, in order to ensure the accuracy of the push content, in this embodiment, the push content candidate terminal may store the message content uploaded by the user, and may additionally store the exposure statistical parameters and click statistical parameters of a plurality of the message uploaded by a plurality of users, such that the exposure statistical parameters and click statistical parameters of the plurality of the message uploaded by the plurality of users may be referred in determining the target push content using the content push algorithm, so as to improve the accuracy of the push content. In this embodiment, after the plurality of message content uploaded by the plurality of users are pushed to the push users, the expose events and the click events on the plurality of message content uploaded by the users may be collected in real time, and the exposure statistical parameters and the click statistical parameters of the plurality of message content uploaded by the user may be updated based on the expose events and the click events, so as to improve the accuracy of the subsequent push content.

In S440, the target push content of the push users at the push time points corresponding to the push service types is determined using the dynamically configured content push algorithm at the content request opportunities.

In S450, display style parameters of the target push content are determined based on version information of clients to which the push users log in and/or history behavior data of the push users.

Optionally, after determining the target push content of the push users at the push time points corresponding to the push service types, the display style parameter of the target push content may be additionally added to improve the click rate of the push user for the target push content. The style server looks up version information of the client to which the push user logs in, analyzes history behavior data of the push user for the pushed message content, and determines display style parameters of the target push content based on the version information of the client to which the push user logs in and/or the history behavior data of the push user. For example, for a push user who has not browsed the push content within a predetermined time period, the target push content may be set as a pop-up style push to prompt the push user to browse.

In S460, the target push content and the display style parameters corresponding to the target push content are pushed to the push users.

In the case that the target push content and the display style parameters corresponding to the target push content are pushed to the push users, the clients to which the push users log in may correspondingly display the target push content based on the display style parameters. In this way, the personalized display of the target push content is improved, and the information push is fully achieved for different clients.

In the technical solutions according to this embodiment, the push time points of the users for different push service types are correspondingly updated at the predetermined time interval to improve the integrity and accuracy of the push time points. Meanwhile, the exposure statistical parameters and the click statistical parameters of the content uploaded by the users are updated in real time, so as to ensure the accuracy of the target push content. The display style parameters of the target push content are additionally acquired, such that the personalized display of the target push content is improved, and the information push is fully achieved for different clients. The target push content corresponding to the push time points for the push service types are acquired at the suitable content request opportunities prior to the push time points for the push service types, such that a closed loop of content production, content selection, and content push formed in the information push service is achieved, and the accuracy of the push time points and the push content is improved.

Fifth Embodiment

Figure 5:
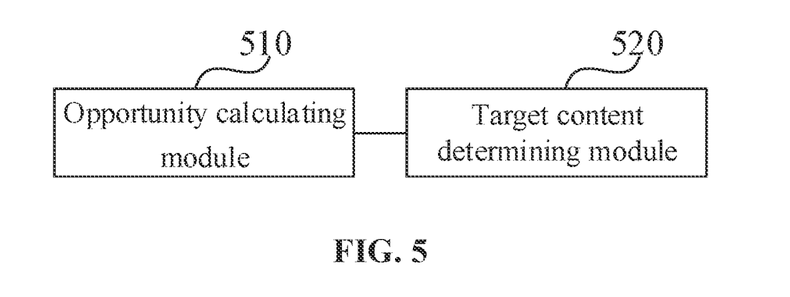
FIG. 5 is a schematic structural diagram of an apparatus for pushing information according to a fifth embodiment of the present disclosure.

FIG. 5 is a schematic structural diagram of an apparatus for pushing information according to this embodiment. In particular, as shown in FIG. 5, the apparatus may include:

an opportunity calculating module, configured to calculate content request opportunities that match push service types corresponding to push time points of push users and user bases at the push time points, wherein the push time points are calculated according to push time point rules for different push service types; and a target content determining module, configured to determine, at the content request opportunities, target push content of the push users at the push time points corresponding to the push service types using the dynamically configured content push algorithm, wherein the target push content is content for the push service types corresponding to the push time points.

In the technical solutions according to this embodiment, the push service types corresponding to the push time points for the different push service types and the user bases at push time points are calculated according to push time point rules for the different push service types, the content request opportunities corresponding to the push time points are determined based on the push service types and the user bases, wherein the content request opportunities are prior to push time points. The target push content of the push users at the push time points corresponding to the push service types is determined at the content request opportunities using the dynamically configured content push algorithm, such that the target push content at the push time points may be timely acquired prior to the push time points, the slow content generation caused by excessively large system throughput and congested content are avoided, and the target push content may be successfully generated prior to the push time point to ensure timeliness of the information push and the system stability. Meanwhile, the push content generating terminal achieves the extendibility of the content push algorithm by dynamically configuring the content push algorithm. In this embodiment, the content generation request is initiated prior to the push time point corresponding to the push service type, and the target push content corresponding to the push service type is generated using the dynamically configured content push algorithm, such that a closed loop of content production, content selection, and content push formed in the information push service is achieved, and the accuracy of the push time points and the push content is improved.

The apparatus for pushing information described above may further include a time point calculating module configured to calculate the push time points of the push users for the different push service types according to the push time point rules for the different push service types at the predetermined time interval.

The target content determining module 520 is configured to recall, at the content request opportunities, initial sets of push content under the predetermined condition from the pool of content candidates for the push users using the predetermined dynamically configured similarity algorithm; and rank a plurality of message content in the initial sets of push content using a predetermined match algorithm, and select the target push content of the push users at the push time points corresponding to the push service types based on the ranking result.

The apparatus for pushing information described above may further include a style determining module, configured to determine, based on at least one of version information of clients to which the push users log in and/or history behavior data of the push users, display style parameters of the target push content.

The apparatus for pushing information described above may further include a pushing module, configured to push the target push content and the display style parameters of the target push content to the push users.

The apparatus for pushing information described above may further include a statistical parameter updating module, configured to collect expose events and click events on message content uploaded by different push users, and correspondingly update, based on the expose events and the click events, exposure statistical parameters and click statistical parameters of the message content, so as to determine, based on the exposure statistical parameters and the click statistical parameters of the message content uploaded by the push users, the target push content of the push users at the push time points corresponding to the push service types using the content push algorithm.

The apparatus for pushing information according to this embodiment may be applicable to the method for pushing information according to any of the embodiments described above, and have corresponding functions.

Sixth Embodiment

Figure 6:
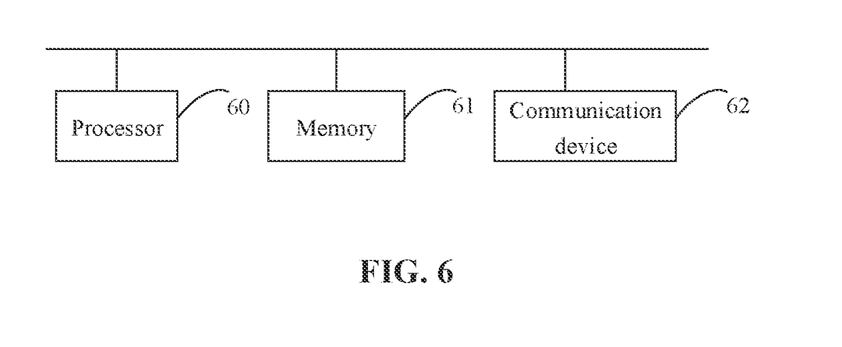
FIG. 6 is a schematic structural diagram of a device according to a sixth embodiment of the present disclosure.

FIG. 6 is a schematic structural diagram of a device according to this embodiment. As shown in FIG. 6, the device includes a processor 60, a memory 61, and a communication device 62. One or more processors 60 may be configured in the device. For example, taking one processor 60 as an example in HG. 6, the processor 60, the memory 61, and the communication device 62 in the device may be connected by a bus or the like. For example, FIG. takes bus connection as an example.

The memory 61, as a computer-readable storage medium, is configured to store software programs, computer-executable programs, and modules, such as the program instructions/modules corresponding to the method for pushing information according to the embodiments of the present disclosure. The processor 60 executes various function applications and data processing of the device (i.e., performing the method for pushing information described above) by executing the software programs, the instructions, and the modules stored in the memory 61.

The memory 61 may primarily include a storage program area and a storage data area. The storage program area may store an operation system, an application required by at least one function, and the storage data area may store data created based on the use of the terminal, and the like. Furthermore, the memory 61 may include a high-speed random access memory, and a non-volatile memory, such as at least one of a magnetic disk memory, a flash memory, or other non-volatile solid state memory. In some embodiments, the memory 61 may include a memory remotely disposed relative to the processor 60, which may be connected to the device over a network. Examples of such networks include, but are not limited to, the Internet, an intranet, a local area network, a mobile communication networks, and any combination thereof.

The communication device 62 is configured to achieve a network connection or a mobile data connection among devices.

The apparatus in this embodiment may be configured to perform the method for pushing information according to any of the embodiments described above, and have corresponding functions.

Seventh Embodiment

This embodiment further provides a computer-readable storage medium. The computer-readable storage medium stores a computer program. The computer program, when executed by a processor, causes the processor to perform the method for pushing information in any of the above embodiments. The method may include:

calculating content request opportunities that match push service types corresponding to push time points of push users and user bases at the push time points, wherein the push time points are calculated according to push time point rules for different push service types; and determining, at the content request opportunities, target push content of the push users at the push time points corresponding to the push service types using the dynamically configured content push algorithm, wherein the target push content is content for the push service types corresponding to the push time points.

For the storage medium including computer-executable instructions according to this embodiment of the present disclosure, the computer-executable instructions are not limited to the method operations described above, and may also be executed to perform related operations in the method for pushing information in any one of the embodiments of the present disclosure.

It should be apparent to those skilled in the art from the foregoing description of the embodiments that, the present disclosure may be implemented by software and the necessary general purpose hardware, and may be implemented by hardware, and the former is a preferable implementation. Based on such understandings, the essence of the technical solution of the present disclosure or the portion contributed to the related art may be embodied in the form of a software product. The computer software product may be stored in a computer-readable storage medium, for example, a floppy disk, a read-only memory (ROM), a random-access memory (RAM), a flash memory (FLASH), a hard disk, or an optical disk of a computer, and the like. The computer software product includes a plurality of instructions to cause the computer device (a personal computer, a server, or a network device) to perform the method described above.

It should be noted that, in the above embodiments of the apparatus for recommending information, the included units and modules are merely divided according to function logic, but are not limited to the division described above, so long as the corresponding functions can be implemented. In addition, the names of the functional units are also merely for distinction, and are not intended to limit the scope of the present disclosure.

What is claimed is:

1. A system for pushing information, comprising:
a time-driven scheduling terminal;
a push content generating terminal; and
a push content candidate terminal;
wherein the time-driven scheduling terminal comprises one or more processors that, when executes one or more programs, is configured to calculate push time points of push users for different push service types according to push time point rules for the different push service types, and initiate content generation requests based on push service types and user bases at same push time points, wherein the push time point rules comprises manual intervention arrangements and predetermined push time algorithms, wherein the manual intervention arrangements are applied to organize the push users in terms of different attributes, and the predetermined push time algorithms are applied to analyze history behaviors data of the push users;
the push content generating terminal comprises a server configured to select, based on the content generation requests, target push content of the push users at the push time points corresponding to the push service types from the push content candidate terminal using a dynamically configured content push algorithm, and feed the target push content back to the time-driven scheduling terminal,
wherein the dynamically configured content push algorithm is pre-configured and dynamically updated; and
wherein the time-driven scheduling terminal comprises a time point server, a content request server, and a content push server; wherein
the time point server is configured to calculate the push time points of the push users for the different push service types according to the push time point rules for the different push service types at a predetermined time interval;
the content request server is configured to access the push time points of the push users for the different push service types in the time point server, determine content request opportunities corresponding to the different push time points based on the push service types and the user bases at the same push time points, and initiate the content generation requests to the push content generating terminal at the content request opportunities, wherein the content request opportunities are prior to push time points corresponding to the content request opportunities; and
the content push server is configured to push the target push content corresponding to the push time points that is fed back by the push content generating terminal to the push users at push time points corresponding to the content request opportunities.

2. The system for pushing information according to claim 1, wherein
the push content generating terminal comprises a content recall server and a rank server that are deployed in a distributed mode, and the push content generating terminal comprises one or more processors executing one or more programs to correspondingly distribute the content generation requests of different push users to different content recall servers; wherein
the content recall server is configured to recall, in the case that content generation requests are received, initial sets of push content under a predetermined condition from the push content candidate terminal for the push users using a predetermined similarity algorithm; and
the rank server is configured to rank a plurality of message content in the initial sets of push content using a predetermined match algorithm, and select the target push content of the push users at the push time points corresponding to the push service types based on a ranking result.

3. The system for pushing information according to claim 2, wherein the push content generating terminal further comprises a style server; wherein
the style server is configured to determine, based on at least one of version information of clients to which the push users log in and history behavior data of the push users, display style parameters of the target push content, and feed the target push content and the display style parameters of the target push content back to the time-driven scheduling terminal.

4. The system for pushing information according to claim 1, wherein the push content candidate terminal comprises a conventional content memory and a professional content memory; wherein
the conventional content memory is configured to store original content uploaded by an ordinary user in a push application; and
the professional content memory is configured to store content uploaded by an authenticated professional user in the push application.

5. The system for pushing information according to claim 1, further comprising a stream task service terminal; wherein
the stream task service terminal comprises one or more processors executing one or more programs to collect message content uploaded by the push users, store the message content to the push content candidate terminal, and correspondingly update, based on expose events and click events of the message content uploaded by the push users, exposure statistical parameters and click statistical parameters of the message content on the push content candidate terminal.

6. The system for pushing information according to claim 5, wherein
the stream task service terminal comprises a content collection server and a reflow statistical server; wherein
the content collection server is configured to collect a plurality of message content uploaded by a plurality of push users in real-time, and store, based on types of the plurality of push users, the plurality of message content to the push content candidate terminal; and
the reflow statistical server is configured to collect the expose events and the click events on message content uploaded by the plurality of push users in real time, and send exposure notifications corresponding to the expose events and click notifications corresponding to the click events to the push content candidate terminal, such that the push content candidate terminal updates the exposure statistical parameters and the click statistical parameters of the message content.

7. A method for pushing information, applied to a system for pushing information, comprising:

calculating push time points of push users for different push service types according to push time point rules for the different push service types at a predetermined time interval;

calculating content request opportunities that match push service types corresponding to the push time points of the push users and user bases at the push time points, wherein the push time points are calculated according to the push time point rules for the different push service types; and determining, at the content request opportunities, target push content of the push users at the push time points corresponding to the push service types using a dynamically configured content push algorithm, wherein the target push content is content for the push service types corresponding to the push time points; and pushing the target push content corresponding to the push time points to the push users at push time points corresponding to the content request opportunities;

wherein calculating the content request opportunities that match the push service types corresponding to the push time points of the push users and the user bases at the push time points comprises:

accessing the push time points of the push users for the different push service types, and determining content request opportunities corresponding to the different push time points based on the push service types and the user bases at the same push time points, wherein the content request opportunities are prior to push time points corresponding to the content request opportunities.

8. The method according to claim 7, wherein determining, at the content request opportunities, the target push content of the push users at the push time points corresponding to the push service types using the dynamically configured content push algorithm comprises:

recalling, at the content request opportunities, initial sets of push content under a predetermined condition from a pool of content candidates for the push users using a predetermined dynamically configured similarity algorithm; and ranking a plurality of message content in the initial sets of push content using a predetermined match algorithm, and select the target push content of the push users at the push time points corresponding to the push service types based on a ranking result.

9. The method according to claim 7, wherein after determining, at the content request opportunities, the target push content of the push users at the push time points corresponding to the push service types using the dynamically configured content push algorithm, the method further comprises:

determining, based on at least one of version information of clients to which the push users log in and history behavior data of the push users, display style parameters of the target push content.

10. The method according to claim 9, wherein after determining the display style parameters of the target push content, the method further comprises:

pushing the target push content and the display style parameters of the target push content to the push users.

11. The method according to claim 7, wherein prior to determining, at the content request opportunities, the target push content of the push users at the push time points corresponding to the push service types using the dynamically configured content push algorithm, the method further comprises:

collecting expose events and click events on message content uploaded by different push users, and correspondingly updating, based on the expose events and the click events, exposure statistical parameters and click statistical parameters of the message content, so as to determine, based on the exposure statistical parameters and the click statistical parameters of the message content, the target push content of the push users at the push time points corresponding to the push service types using the content push algorithm.

12. A non-transitory computer-readable storage medium, storing a computer program, wherein the program, when run by a processor, causes the processor to perform the method for pushing information as defined in claim 9.

13. A computer device for pushing information, comprising:

one or more processors; and a memory, configured to store one or more programs;

wherein the one or more processors, when executes running the one or more programs, are caused to perform a method for pushing information, comprising:

calculating push time points of push users for different push service types according to push time point rules for the different push service types at a predetermined time interval;

calculating content request opportunities that match push service types corresponding to the push time points of the push users and user bases at the push time points, wherein the push time points are calculated according to the push time point rules for the different push service types; and determining, at the content request opportunities, target push content of the push users at the push time points corresponding to the push service types using a dynamically configured content push algorithm, wherein the target push content is content for the push service types corresponding to the push time points; and pushing the target push content corresponding to the push time points to the push users at push time points corresponding to the content request opportunities;

wherein calculating the content request opportunities that match the push service types corresponding to the push time points of the push users and the user bases at the push time points comprises:

accessing the push time points of the push users for the different push service types in a time point server, and determining content request opportunities corresponding to the different push time points based on the push service types and the user bases at the same push time points, wherein the content request opportunities are prior to push time points corresponding to the content request opportunities.

14. The computer device for pushing information according to claim 13, wherein determining, at the content request opportunities, the target push content of the push users at the push time points corresponding to the push service types using the dynamically configured content push algorithm comprises:

recalling, at the content request opportunities, initial sets of push content under a predetermined condition from a pool of content candidates for the push users using a predetermined dynamically configured similarity algorithm; and ranking a plurality of message content in the initial sets of push content using a predetermined match algorithm, and select the target push content of the push users at the push time points corresponding to the push service types based on a ranking result.

15. The computer device for pushing information claim 13, wherein after determining, at the content request opportunities, the target push content of the push users at the push time points corresponding to the push service types using the dynamically configured content push algorithm, the method further comprises:
   determining, based on at least one of version information of clients to which the push users log in and history behavior data of the push users, display style parameters of the target push content.

16. The computer device for pushing information claim 15, wherein after determining the display style parameters of the target push content, the method further comprises:
   pushing the target push content and the display style parameters of the target push content to a time-driven scheduling terminal.

17. The computer device for pushing information claim 13, wherein prior to determining, at the content request opportunities, the target push content of the push users at the push time points corresponding to the push service types using the dynamically configured content push algorithm, the method further comprises:
   collecting expose events and click events on message content uploaded by different push users, and correspondingly updating, based on the expose events and the click events, exposure statistical parameters and click statistical parameters of the message content, so as to determine, based on the exposure statistical parameters and the click statistical parameters of the message content, the target push content of the push users at the push time points corresponding to the push service types using the content push algorithm.

* * * * *